(12) United States Patent
Cabezas et al.

(10) Patent No.: US 7,246,272 B2
(45) Date of Patent: Jul. 17, 2007

(54) DUPLICATE NETWORK ADDRESS DETECTION

(75) Inventors: Rafael Graniello Cabezas, Austin, TX (US); Anh Tuan Dang, Austin, TX (US); Binh Hua, Austin, TX (US); Jason Eric Moore, Austin, TX (US); Elizabeth Silvia, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 10/758,859

(22) Filed: Jan. 16, 2004

(65) Prior Publication Data

US 2005/0188241 A1    Aug. 25, 2005

(51) Int. Cl.
*G06F 11/00* (2006.01)
(52) U.S. Cl. .............. 714/53; 714/4; 714/43; 370/395.54; 370/395.5; 726/13
(58) Field of Classification Search ............ 714/4, 714/43, 53; 726/13; 370/395.5, 395
See application file for complete search history.

(56) References Cited

U.S. PATENT DOCUMENTS

| | | | |
|---|---|---|---|
| 5,708,654 A | 1/1998 | Arndt et al. ............ 370/242 |
| 6,363,423 B1 | 3/2002 | Chiles et al. ............ 709/224 |
| 6,493,340 B1 | 12/2002 | Kawanaka ............ 370/392 |
| 6,609,152 B1 | 8/2003 | Ono ............ 714/2 |
| 6,671,828 B1* | 12/2003 | Tursich ............ 714/4 |
| 2003/0021272 A1* | 1/2003 | Celebioglu et al. ........ 370/392 |
| 2004/0133761 A1* | 7/2004 | Goodman ............ 711/210 |
| 2004/0174904 A1* | 9/2004 | Kim et al. ............ 370/475 |

FOREIGN PATENT DOCUMENTS

| | | |
|---|---|---|
| JP | 3212038 | 1/1990 |
| JP | 11112548 | 4/1999 |
| JP | 2001144806 | 11/1999 |

OTHER PUBLICATIONS

"Fast Duplicate Address Detection During Registration with a Wireless LAN", IBM Technical Disclosure Bulletin (TBD/RD), Aug. 1998, RD-412070-A, Article 41270.
"Weak Duplicate Address Detection in Mobile Ad Hock Networks", ACM Digital Library, Vaidya, NH, 2002.
"What is a Packet?" by HowStuffWorks.com, downloaded on Nov. 12, 2003 from http://www.howstuffworks.com, 2 pages.
"How Ethernet Works" by HowStuffWorks.com, downloaded on Nov. 12, 2003 from http://www.howstuffworks.com, 7 pages.

* cited by examiner

*Primary Examiner*—Robert Beausoliel
*Assistant Examiner*—Joseph D. Manoskey
(74) *Attorney, Agent, or Firm*—Robert H. Frantz; Jeffrey S. LaBaw

(57) ABSTRACT

A plurality of data packets encoded according to a first protocol are received which encapsulate data encoded according to a second protocol. A first source address is extracted from the packets according to the first protocol, it is determined whether or not the first source address is a substantial duplicate of a known assigned address. If it is a duplicate, a second source address is extracted from the encapsulated data according to the second protocol, and the first source address and said second source address are provided in an enhanced error log so that a system administrator may correct the duplicate assigned address. Enhanced embodiments of the invention included analysis of data encapsulated by a third, fourth and subsequent protocols, and automatic determination of each protocol encoding format.

24 Claims, 8 Drawing Sheets

DUPLICATE NETWORK ADDRESS DETECTION

BACKGROUND OF THE INVENTION

1. Field of the Invention

The present invention relates to technologies for managing assignable network addresses to devices and adapters in computer and data communications networks, and especially to methods and processes for detecting duplicate network addresses.

2. Background of the Invention

FIG. 1 shows a typical example of a computer communications network or data communications network (11), which interconnects a number of network devices $ND_1$, $ND_2, \ldots ND_M, \ldots ND_N, \ldots ND_P, ND_{P+1} \ldots ND_Q$ (17, 18, 19, 12, 103, 104, 105, 106). Certain portions of the total network (10) may be isolated or partitioned into subnetworks ("subnets") (15, 101, 102) by devices such as switches, bridges, and routers (14, 100, 103), while other devices such as $ND_N$ (12) may be directly connected to a larger or central portion (11) of the network (10).

In a computer communications networks, each device connected to the network (e.g. a "network adapter") typically has its own, unique low level address, such as a manufacturer assigned Media Access Control Address ("MAC") in the case of an Ethernet network. A network adapter's address is used to uniquely identify the adapter in the network when sending it data, or when receiving data from it. In a healthy network, no two adapters have the same address. Data is typically transmitted in such networks in small bursts, often referred to as packets, frames, or cells, depending on the network origins and terminology.

However, most network adapters also provide a software-definable address which overrides or replaces the manufacturer-supplied address. These "soft" addresses are often used by systems to reorganize or optimize the addressing scheme within a local area network ("LAN"), or within a wide area network ("WAN"). Such software defined addresses are referred to as Locally Administered Addresses ("LAA") in the Ethernet paradigm.

Care must be taken when assigning soft addresses to avoid assigning an address which is the same as the address of another network adapter on the same network. An invalid address will cause networking problems, especially in the case when the invalid address is a duplicate of another address on the same subnet.

Most data network protocols, such as Ethernet, provide some sort of fundamental process or mechanism to detect duplicate addresses, and in some cases, reassign them. Ethernet's Address Resolution Protocol ("ARP"), and Internet Protocol's ("IP") Duplicate Address Detection ("DAD") processes are two such mechanisms. FIG. 2 generally illustrates a relatively simple process (30) employed by many protocols to detect duplicate addresses, in which a unit receives (31) a frame or packet, extracts the sending unit's address (32), determines if it appears to be a duplicate address (33), and if so, simply reports (35) the duplicate address value (36) to an error log. At this point, it is up to the administrator to try to determine from only this information which unit or units are improperly using the same network address. If the sending unit address does not appear to be a duplicate address, the frame or packet is handled normally (34) (e.g. terminated, delivered, routed, switched, etc.).

The typical logic in LAN adapters today only reports a duplicate network address, usually through event interrupt to a host processor when a network adapter receives a message or packet from two sources which claim to have the same return address (e.g. source address). This logic typically does not give any more detail data, as the protocol does not readily provide any other diagnostic information which the logic can easily report. IP DAD is well known to perform poorly in the presence of partitions, and because of its dependence on the use of timeouts, can be error prone in network where entry and exit of devices is expected often.

When a duplicate address is detected by Ethernet ARP, message "storms" can create excessive LAN traffic to duplicate MAC addresses. In addition, Ethernet switches can be adversely affected (ports taken out of services) and packets can be incorrectly routed. Ethernet LAA and similar redefinable address capabilities in other network types create a much higher possibility of assigning duplicate network addresses, which often creates many network problems.

With no additional data on which to operate, there is no easy way for a system administrator to determine which network adapters in which network-attached systems are sharing duplicate addresses.

This problem is exasperated by newer networks which "auto-configure"; i.e. each network adapter is automatically assigned an address upon entry or connection to the network. Many wired and wireless network protocols include auto-configuration processes, some of which include use of an address server (16, 13). For example, in Internet Protocol, dynamic host address assignment is provided in many cases by Dynamic Host Configuration Protocol ("DHCP"), which requires access to a DHCP server to act as a centralized arbitrator and controller of addresses. However, there are many situations in which access to a centralized server is intermittent or unavailable, such as certain types of wireless networks and especially small networks.

One alternative which has reportedly been proposed for systems which use large IP address values has been to somehow embed the Ethernet MAC address of a device into the dynamically assigned IP address, assuming that the MAC address is unique. But, in some cases, this is not feasible, such as attempting to embed a 48-bit IEEE 802.11 MAC address into a 32-bit IP (Version 4) address.

Another proposed solution is to issue some sort of message on a network which uses a potential address for assignment to see if a response is received from another adapter already having that address. In order to complete this process, a time limit must be assumed, after which if no response has been received, it is assumed that the potential address is free to be assigned to a newly attached or connected device. However, in some networks where large, unbounded delays are possible such as systems with many partitions, selection of an appropriately long time out value may not be possible, thereby rendering the method inoperable or impractically slow in some situations.

SUMMARY OF THE INVENTION

The present invention enhances typical duplicate address detection logic on networked devices to not only report duplicate network addresses, but also report any available addresses contained in a second or subsequent protocol being carried by the data. In this manner, more information may be mined from the available data on the network without the need for adopting or changing network protocols, hardware, etc.

For example, in a situation where IP packets are encapsulated in Ethernet protocols (e.g. IP over Ethernet), when a duplicate Ethernet MAC address is detected in a received Ethernet frame, if payload of the frame is inspected to find an IP address header, and the IP address of the sending unit is extracted. As such, both the duplicate MAC address and the IP address of the offending unit can be reported. There is a useful improbability that the offending unit (e.g. the later-assuming unit for the previously-assigned MAC address) also would have a duplicate IP address, and thus the IP address can be used to uniquely identify the unit which needs to be reassigned.

Network administrators are provided more data to locate the networked device(s) sharing addresses so that corrective action may be taken, either manually or automatically.

According to an alternate embodiment of the present invention, the network device can be automatically commanded to switch to a new address, and the secondary address (e.g. the IP address) can be used to obtain and report other information (e.g. URL, administrative contact information, etc.) from name servers such as Domain Name Servers, "WhoIs" servers, etc.

BRIEF DESCRIPTION OF THE DRAWINGS

The following detailed description when taken in conjunction with the figures presented herein provide a complete disclosure of the invention.

DESCRIPTION OF THE INVENTION

The present invention is preferably realized as a software-implemented process executed by a processor or embedded controller of a networked device, network adapter, or similar hardware circuit. We will refer to the full range of hardware devices which may host or execute such a process as a "platform". As such, we first turn our attention to description of suitable computing platforms with which the present invention may be realized.

Suitable Computing Platforms

Figure 1:
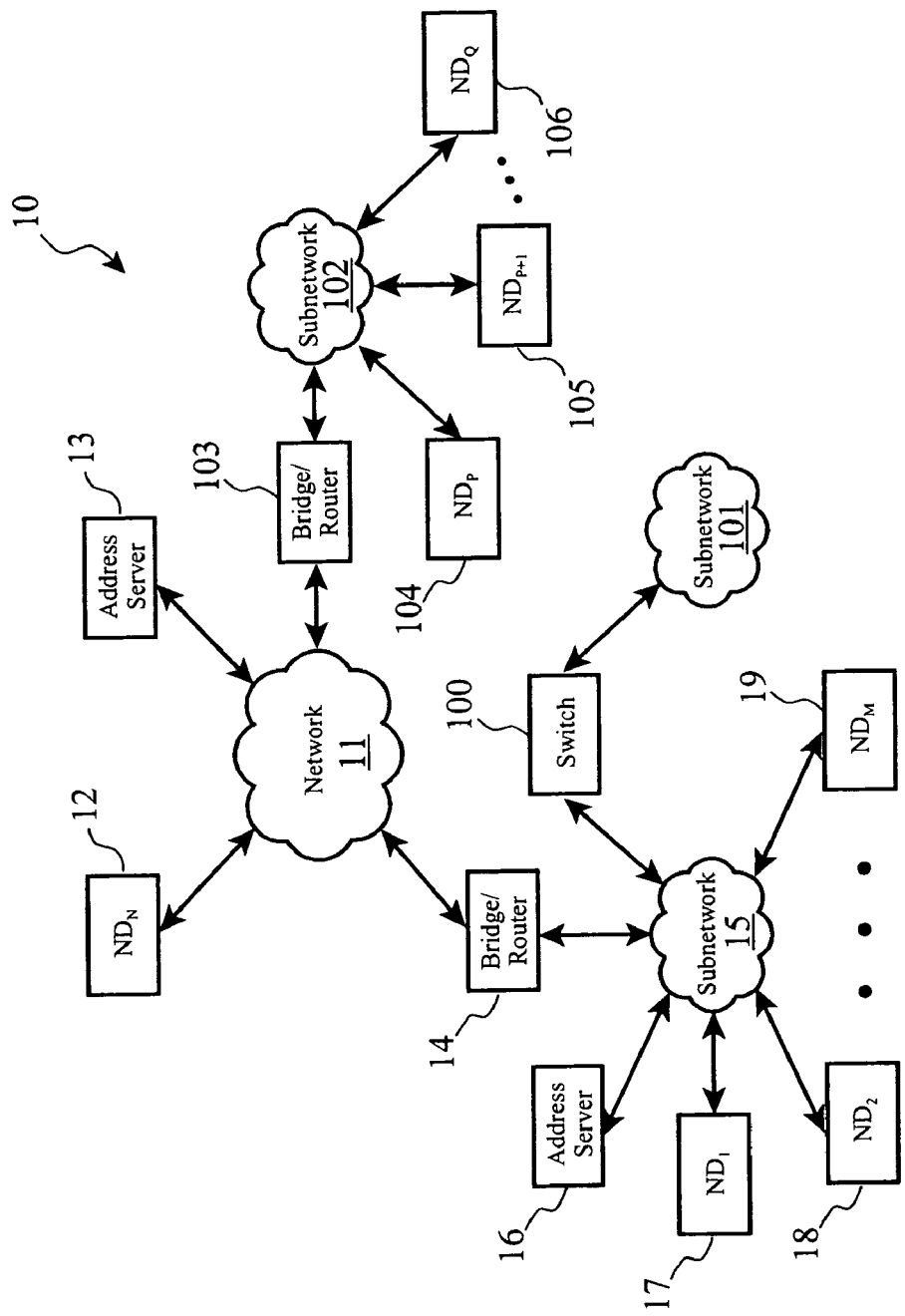
FIG. 1 depicts a typical computer and data communications arrangement including a plurality of networked devices, subnetworks, and bridges, routers, or switches.
Figure 2:
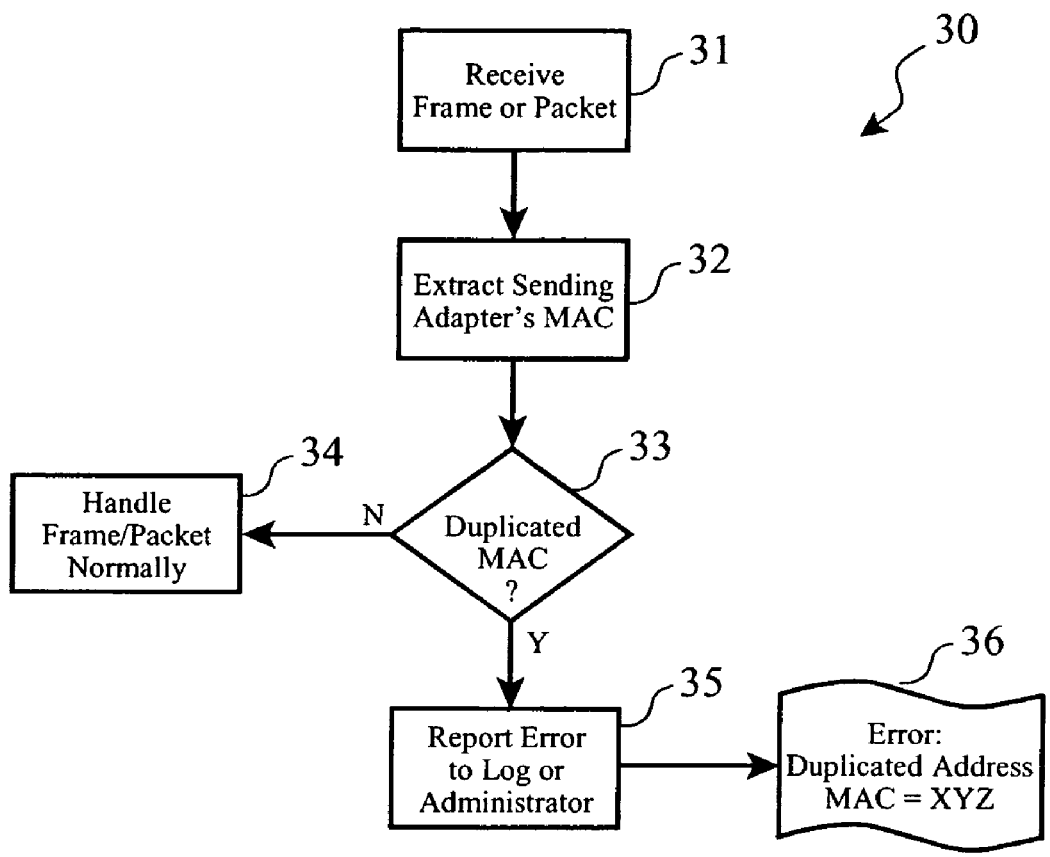
FIG. 2 illustrates the logical process generally followed by networked devices of the present art for handling duplicate address contention.

Turning to FIG. 2, a generalized architecture is presented including a central processing unit (81) ("CPU"), which is typically comprised of a microprocessor (82) associated with random access memory ("RAM") (84) and read-only memory ("ROM") (85). Often, the CPU (81) is also provided with cache memory (83) and programmable FlashROM (86). The interface (87) between the microprocessor (82) and the various types of CPU memory is often referred to as a "local bus", but also may be a more generic or industry standard bus.

Many computing platforms are also provided with one or more storage drives (9), such as a hard-disk drives ("HDD"), floppy disk drives, compact disc drives (CD, CD-R, CD-RW, DVD, DVD-R, etc.), and proprietary disk and tape drives (e.g., Iomega Zip[™] and Jaz[™], Addonics SuperDisk[™], etc.). Additionally, some storage drives may be accessible over a computer network.

Many computing platforms are provided with one or more communication interfaces (810), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (811), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (812) allowing the user the ability to easily install and remove hardware expansion devices, such as PCMCIA cards, SmartMedia cards, and various proprietary modules such as removable hard drives, CD drives, and floppy drives.

Often, the storage drives (89), communication interfaces (810), internal expansion slots (811) and external expansion slots (812) are interconnected with the CPU (1) via a standard or industry open bus architecture (88), such as ISA, EISA, or PCI. In many cases, the bus (88) may be of a proprietary design.

A computing platform is usually provided with one or more user input devices, such as a keyboard or a keypad (816), and mouse or pointer device (817), and/or a touch-screen display (818). In the case of a personal computer, a full size keyboard is often provided along with a mouse or pointer device, such as a track ball or TrackPoint[™]. In the case of a web-enabled wireless telephone, a simple keypad may be provided with one or more function-specific keys. In the case of a PDA, a touch-screen (818) is usually provided, often with handwriting recognition capabilities.

Additionally, a microphone (819), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or full motion video digital camera.

One or more user output devices, such as a display (813), are also provided with most computing platforms. The display (813) may take many forms, including a Cathode Ray Tube ("CRT"), a Thin Flat Transistor ("TFT") array, or a simple set of light emitting diodes ("LED") or liquid crystal display ("LCD") indicators.

One or more speakers (814) and/or annunciators (815) are often associated with computing platforms, too. The speakers (814) may be used to reproduce audio and music, such as the speaker of a wireless telephone or the speakers of a personal computer. Annunciators (815) may take the form of simple beep emitters or buzzers, commonly found on certain devices such as PDAs and PIMs.

These user input and output devices may be directly interconnected (8', 8") to the CPU (81) via a proprietary bus structure and/or interfaces, or they may be interconnected through one or more industry open buses such as ISA, EISA, PCI, etc.

The computing platform is also provided with one or more software and firmware (8101) programs to implement the desired functionality of the computing platforms.

Figure 4:
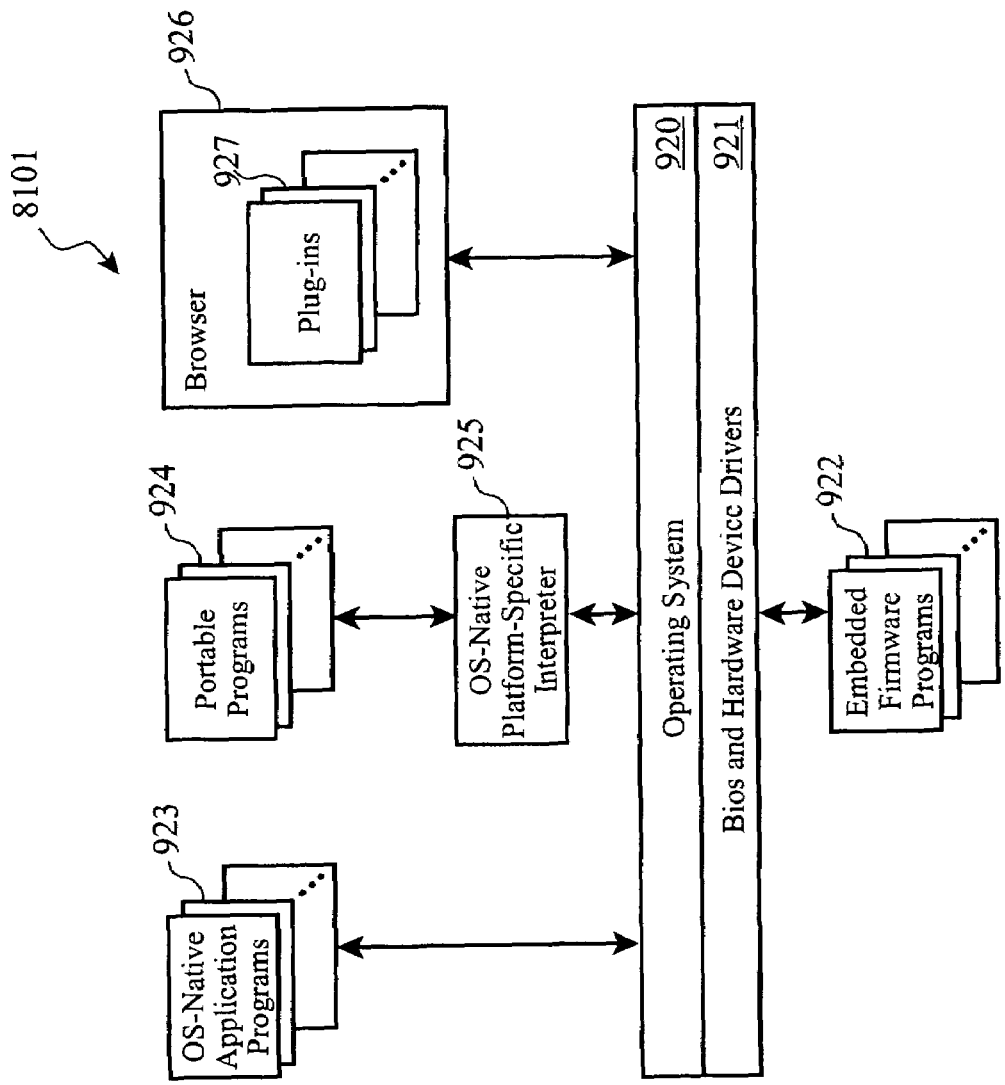
FIG. 4 shows a generalized organization of software and firmware associated with the generalized architecture of FIG. 2.

Turning to now FIG. 4, more detail is given of a generalized organization of software and firmware (8101) on this range of computing platforms. One or more operating system ("OS") native application programs (823) may be provided on the computing platform, such as word processors, spreadsheets, contact management utilities, address book, calendar, email client, presentation, financial and bookkeeping programs.

Additionally, one or more "portable" or device-independent programs (824) may be provided, which must be interpreted by an OS-native platform-specific interpreter (825), such as Java[™] scripts and programs.

Often, computing platforms are also provided with a form of web browser or micro-browser (826), which may also include one or more extensions to the browser such as browser plug-ins (827).

The computing device is often provided with an operating system (820), such as Microsoft Windows[™], UNIX, IBM OS/2[™], LINUX, MAC OS[™] or other platform specific operating systems. Smaller devices such as PDA's and wireless telephones may be equipped with other forms of operating systems such as real-time operating systems ("RTOS") or Palm Computing's PalmOS[™].

A set of basic input and output functions ("BIOS") and hardware device drivers (821) are often provided to allow the operating system (820) and programs to interface to and control the specific hardware functions provided with the computing platform.

Additionally, one or more embedded firmware programs (822) are commonly provided with many computing platforms, which are executed by onboard or "embedded" microprocessors as part of the peripheral device, such as a micro controller or a hard drive, a communication processor, network interface card, or sound or graphics card. In fact, the processes of the present invention may also be realized in firmware for such embedded processors, running under suitable executives or embedded operating systems. Local Area Network interface cards, dial-up modems, and wireless network adapters often contain embedded processors which may be optionally programmed to include processes according to the present invention.

Figure 3:
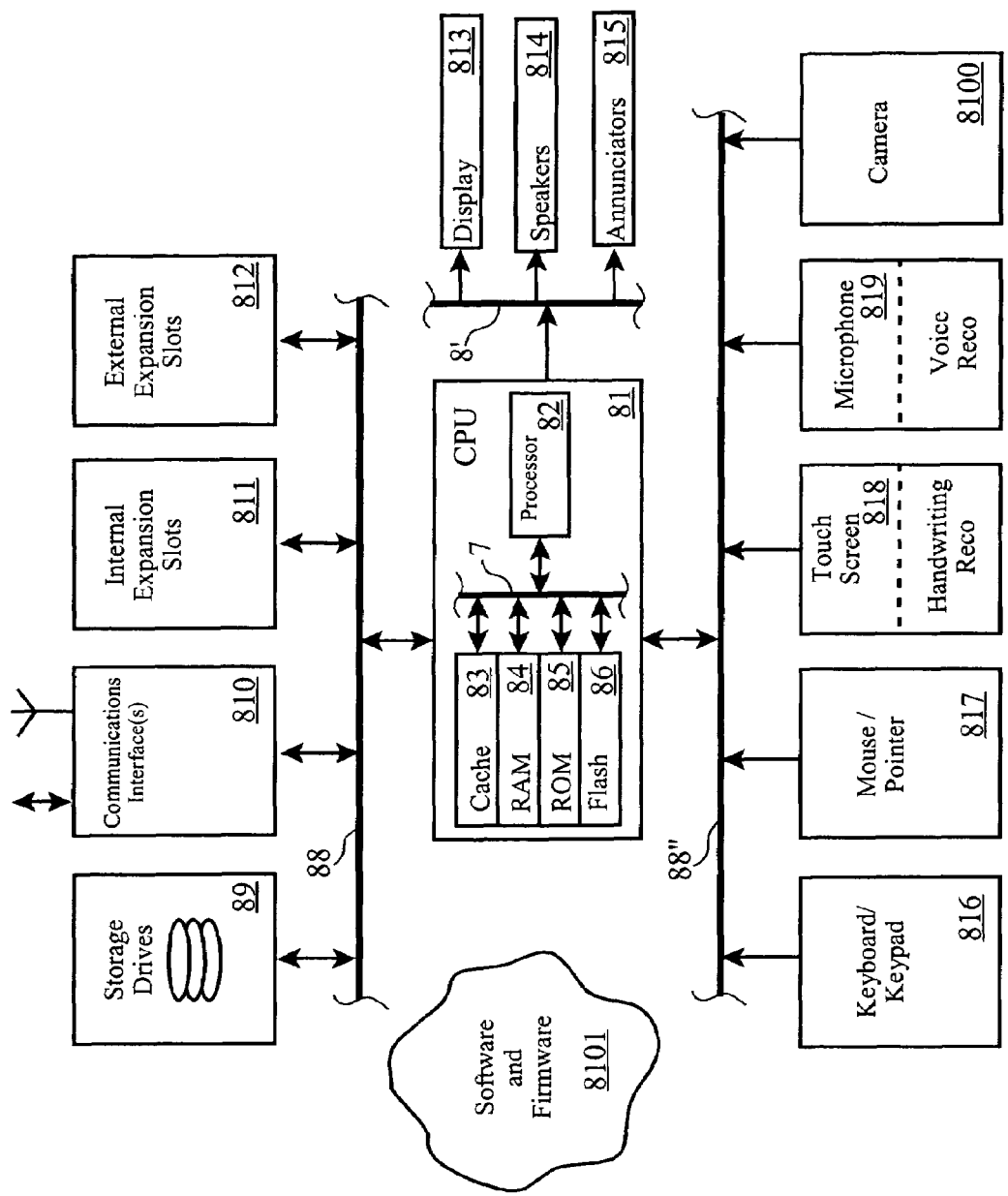
FIG. 3 depicts a generalized computing platform architecture, such as a personal computer, server computer, personal digital assistant, web-enabled wireless telephone, or other processor-based device.

As such, FIGS. 3 and 4 describe in a general sense the various hardware components, software and firmware programs of a wide variety of computing platforms, including but not limited to personal computers, PDAs, PIMs, web-enabled telephones, and other appliances such as WebTV[™] units, as well as an array of embedded processors. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Packetized Network Protocol Generalities

The present invention utilizes the fact that many network protocols are capable of, and often do, carry data which is already formatted into a second protocol from use on another network. We will refer to this as "encapsulation" of the second protocol into or onto the first protocol throughout the present disclosure. It will be recognized by those skilled in the art that additional layers or levels of encapsulation is often performed within the second, third, etc., protocols, and that the present invention is not limited to any particular protocols, although we will use two common protocols to illustrate the invention. For example, many "open" or standardized protocols such as Ethernet, Bluetooth, Universal Serial Bus ("USB"), WiFi, TCP/IP, Point-to-Point Protocol ("PPP"), FDDI, ATM, Fiber channel, as well many proprietary protocols are capable of carrying data encoded for each other. Further, we will refer collectively to packets, frames, cells, and the like as simply "packets". It is within the skill of those in the art to apply the present invention, given the disclosure herein, to alternate protocols which may use alternate terminology.

Figure 5:
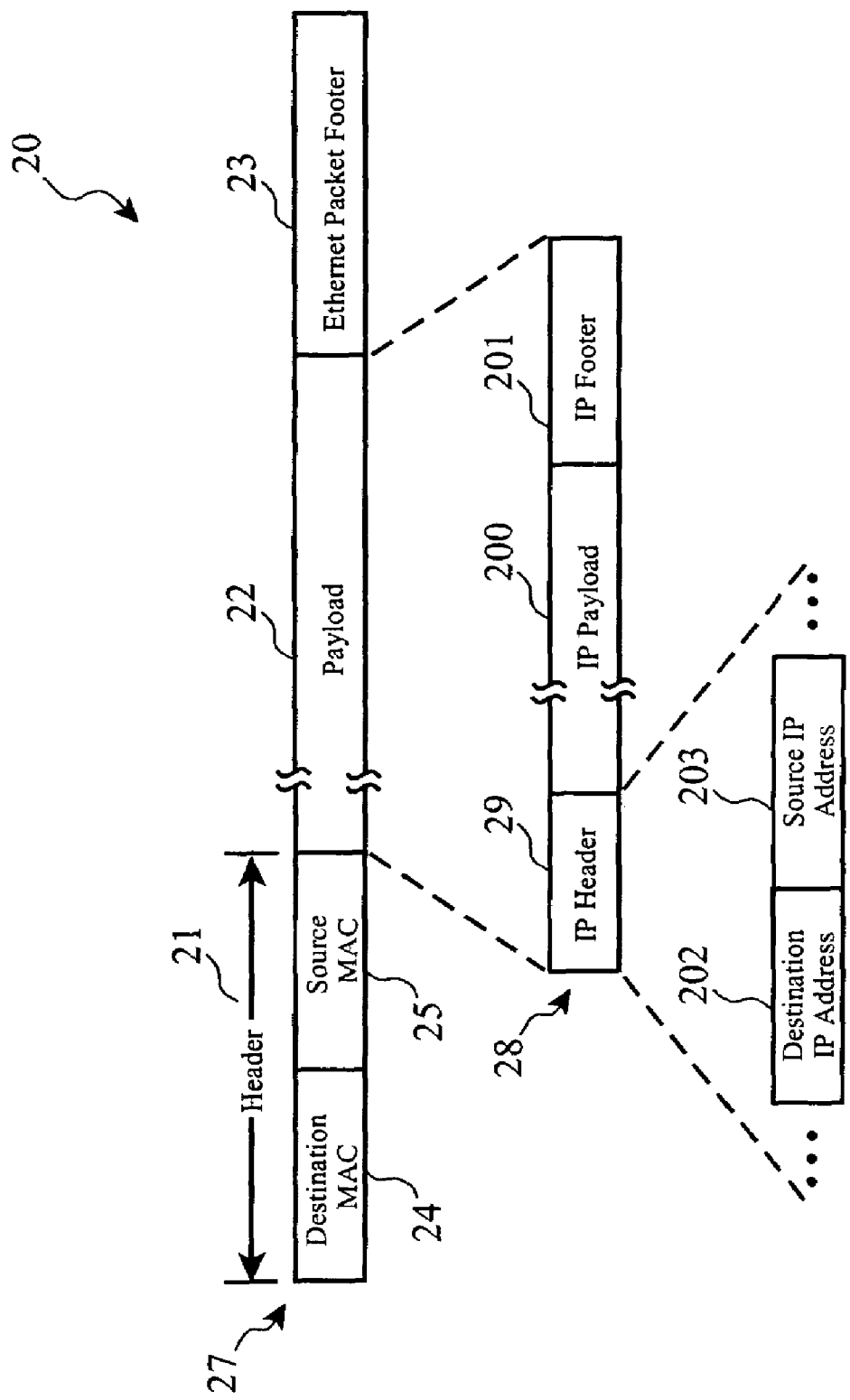
FIG. 5 provides and example of an IP packet being carried in the payload of a Ethernet packet.

Turning to FIG. 5, an illustrative example (20) of an Ethernet packet (27) which is carrying all or part of an IP packet. This situation occurs where a networked device, such as a Personal Computer ("PC"), is accessing the Internet via a local area network. Information which traverses the Internet between servers and browsers, for example, is encoded according to Transmission Control Protocol/Internet Protocol ("TCP/IP"), and packaged into IP packets. The PC, however, interfaces directly to an Ethernet Local Area Network, and indirectly to the Internet. Therefore, the IP packets to and from the PC are encapsulated into one or more Ethernet packets while being carried on the LAN.

As shown, the Ethernet packet (27) includes a header (21), which among other data items includes a destination MAC address (24) and a source MAC address (25). The destination MAC address (24) indicates the terminal or device to which this packet should be delivered, while the source MAC address (25) indicates the address of the terminal or device which sent the Ethernet packet (27) (e.g. a return address).

Following the Ethernet header (21) is a payload (22), which is the portion of the packet (27) that carries data for the destination device from the source device such as parts of a web page, application data, digitized audio or video, etc. In many protocols, the length of the payload is a fixed value (e.g. a set number of bits, bytes, words, etc.), while in other protocols, the length of the payload is variable. In protocols which employ variable length payloads, often the header (21) includes a "packet length" or "payload size" indicator or parameter to assist the receiving unit in properly interpreting the packet.

The payload (22) is followed by a footer (23), which typically includes an error detection parameter such as a Cyclic Redundancy Code ("CRC") value, and some sort of closing flags or bit pattern to conclusively signal the end of the packet.

In this example, the payload (22) does not just carry "raw" data, but is carrying data encoded by a second protocol, in this case IP. An IP packet (28) is carried within the Ethernet payload (22), including an IP header (29), IP payload (200), and an IP footer (21). The IP header, payload, and footer have similar functionality as the Ethernet header, payload, and footer, but varies in implementation detail. For example, the IP header (29) includes a destination IP address (202) and a source IP address (203). It is important to note, however, that the IP source address (203) is not equal to the source MAC address (25), nor is the destination IP address (202) equal to the destination MAC address (24), as these addresses are parts of different protocols and potentially used on different parts of the entire network.

Logical Processes of the Present Invention

Duplicate address resolution processes which are known in the art only attempt to use information available within a single protocol, such as Ethernet-only or Internet Protocol-only information. The present invention, however, employs processes and methods to take advantage of the fact that the payloads of many packets encoded in a first protocol often contain data which is further encoded in a second protocol, and even further to be encoded into additional protocols. This inter-protocol information is extracted in order to produce useful information for resolving an address conflict in the first protocol.

Every time the adapter detects a packet with a duplicate first protocol source address (e.g. a duplicate MAC address), the invention reads further into the first protocol packet to access the payload portion of the packet, instead of stopping with just reading a few bytes for the packet's header.

When looking into the data contained in the first protocol's packet payload, a header of an encapsulated protocol packet can be found as this is typically a known or expected protocol format. For example, it can be known that the first protocol is Ethernet, and that the second or encapsulated data contained within the Ethernet payload will be IP packets. As such, the payload(s) among one or more Ethernet packets from the suspected duplicate MAC source address can be accessed and searched for an IP packet header. When the second or encapsulated protocol header is found, it can be further dissected to find a secondary source address. This secondary source address is then used as a "key" to help indicate or find the offending sending unit which is using a duplicate first-protocol address. Conceptually, searching to find a third, fourth, etc., protocol header encapsulated in the second, third, etc., protocol can also be performed to mine additional data which would assist in identifying the offending sending unit.

As such, the enhanced logic of our invention intelligently finds the Key which will help network administrators identify the duplicate MAC address station in our example (e.g. the IP source address will be the key in a situation of IP-over-Ethernet). The key and the source address from the first protocol is passed to a device driver in order to log an error report which is made available to a system administrator.

Figure 6:
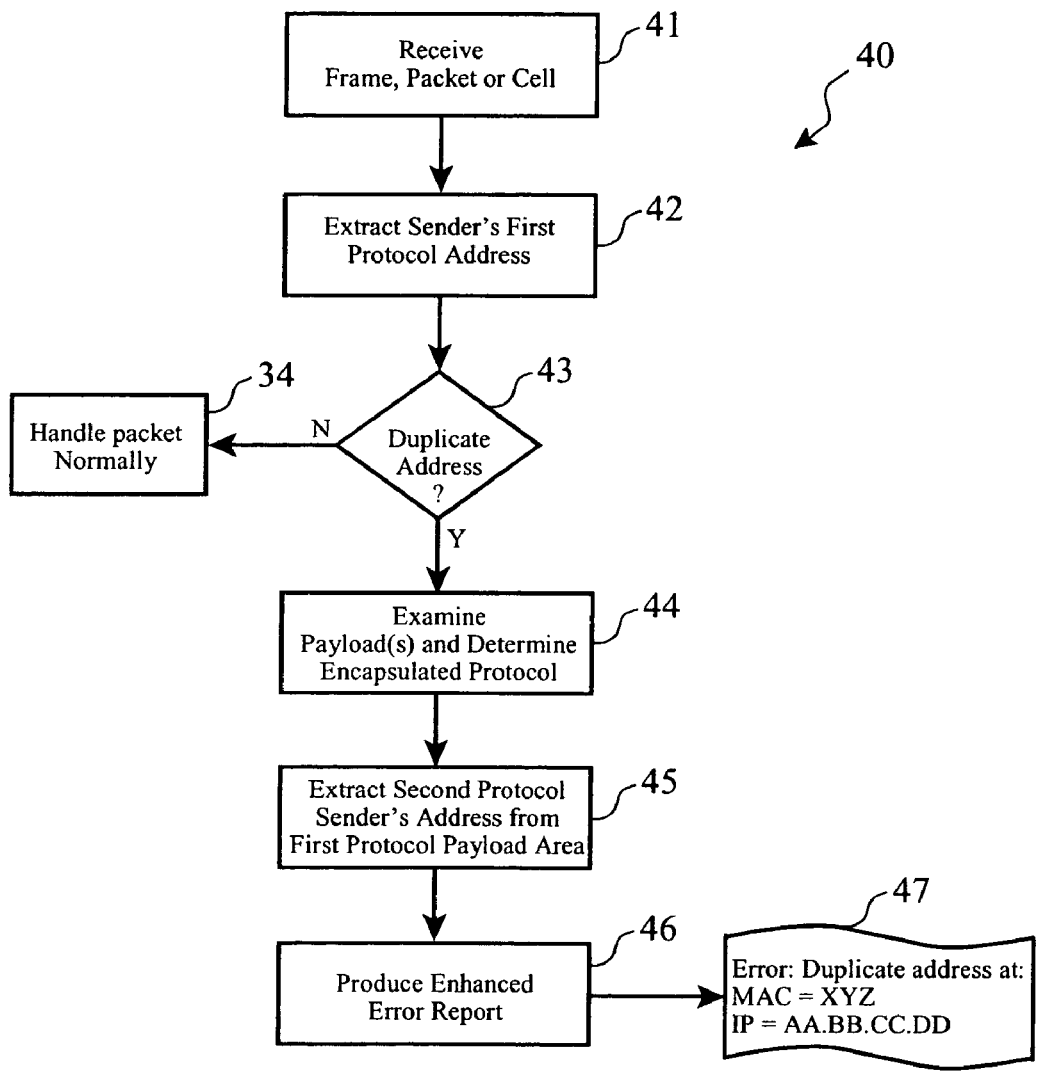
FIG. 6 sets forth a logical process according to the present invention.

Turning now to FIG. 6, a logical process (40) according to the present invention is shown, in which a packet is received (41) by a networked device, and the sender's address is extracted (42) according to the definitions of the primary or first protocol. If the sender's address does not appear to be a duplicate address (43), then the packet is handled normally (e.g. routed, terminated, switched, stored, etc.).

If, however, the sender's address appears to be a duplicate address (43), then the payload of the packet is examined (45) (or of previous or subsequent packets) to find a header for an encapsulated protocol, or secondary protocol. If the encapsulated protocol is known, then the process of finding an encapsulated packet header is relatively straightforward (e.g. searching for a data pattern which indicates a start of a packet according to the encapsulated protocol definitions). It is possible, however, in a more advanced realization of the invention to search (44) for a range of protocol types such that the payload of the primary protocol packets can be automatically analyzed for a range of encapsulated protocols. This type of automatic protocol determination only requires the logical process to search for multiple patterns of data which indicate the opening or beginning of a new packet, and preferably includes logic to search for the end of the same packet to confirm the protocol selection and avoid false protocol identification by data patterns which are present and which alias another protocol's header/footer patterns.

After the beginning of an encapsulated packet is found in the payload(s) of the first packet, the header of the encapslated packet is dissected to extract (45) a source address according to the encapsulated or secondary protocol.

At minimum, this information is then reported (e.g. the first source address and the second source address) to an error report (45), such as reporting a duplicate MAC address and the associated IP address (47) which is being encapsulated from that sending unit. This enhanced error report can then be used by a system administrator to determine exactly which unit(s) are using duplicate addresses, and corrective action may be taken (e.g. reassigning the unit to another address).

Extensibility to Multiple Layers of Protocol Encapsulation

In many situations, the second protocol may yet encapsulate a third protocol, which may further encapsulate a fourth protocol, and so on. For example, consider the PC example previously discussed which is accessing a RealPlayer file (e.g. a digitized video file) from a Real Networks [™] server. So, at the point of entry and exit from the PC's network adapter card interfacing to a LAN, each packet will have the following protocol encapsulation: Ethernet encapsulating IP which in turn encapsulates the Real Networks proprietary protocol. In this example, the first protocol is Ethernet, the second is IP, and the third is Real Network protocol. Extending the logic of the present invention to further examine the third protocol encapsulated data to find a third source address (or fourth, fifth, etc.) can provide even more information to aid a system administrator in finding and correcting addressing problems.

Correlation of Data to Source Names

Many protocols allow or provide a more user-friendly addressing scheme, such as the Internet's Domain Name system. In such networks, a query can be made to a naming server or naming service which will return an address value or conversion. For example, when a user types a web site name (e.g a Uniform Resource Locator or URL) into a web browser, the web browser posts a request to a domain name server to provide an IP address (e.g. a numeric address) corresponding to the user-friendly web site name. For example, the URL may be "www.big-business.com", which may be associated with an IP address of 189.19.54.xx, where xx is a range of subnet values assigned to the URL. As web servers only receive IP packets addressed to IP addresses and not to URL's, the web browser then receives the IP address from the name server, and uses that IP address as a destination address in an Hyper Text Transfer Protocol ("HTTP") "get" request to obtain the index or home page from the addressed web site server.

Figure 7:
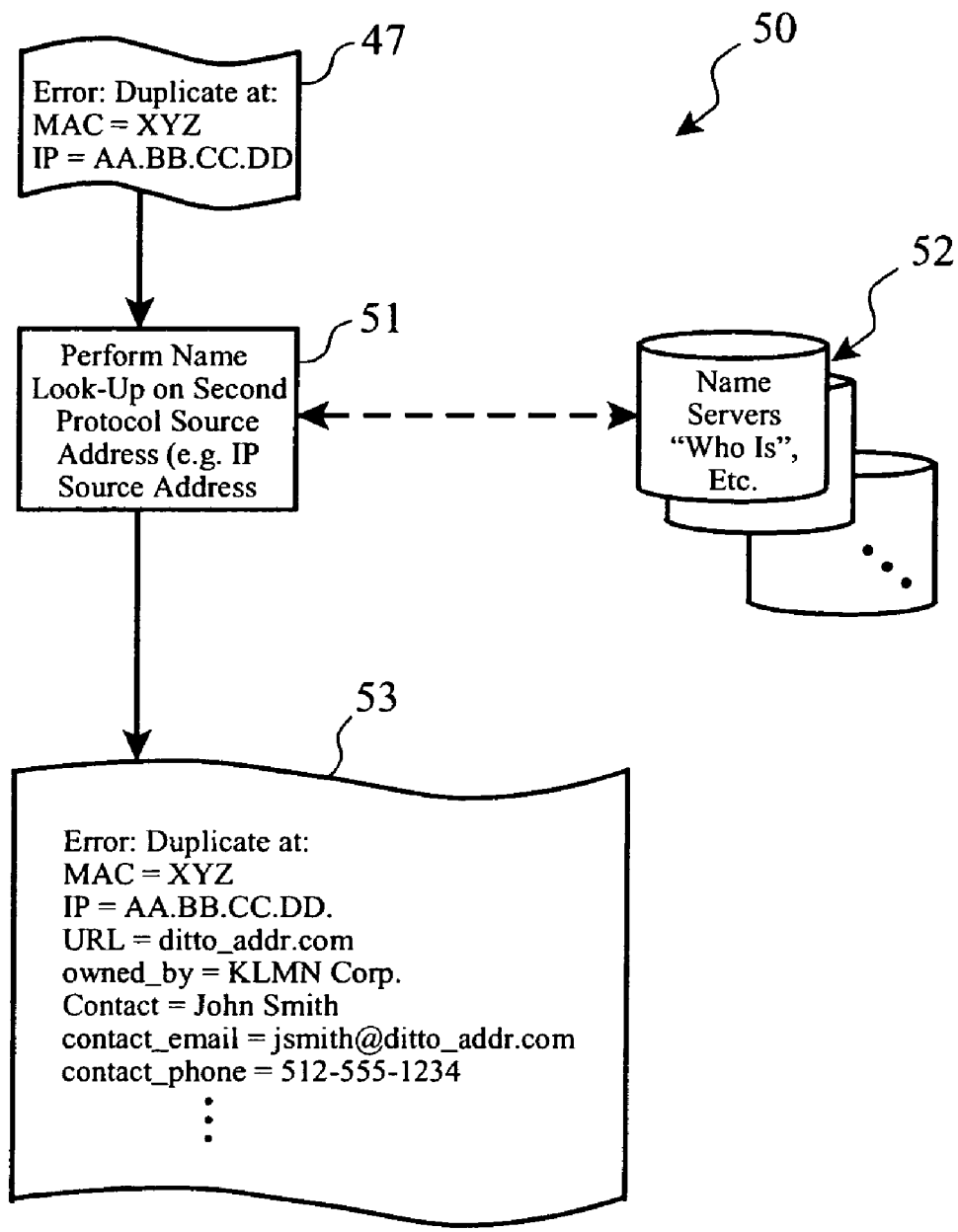
FIG. 7 sets forth an enhanced logical process according to the present invention.

According to one aspect of the present invention, when the secondary (or tertiary, etc.) protocol is a protocol which also provides a naming service, the logical process (50) of the invention takes advantage of this fact as shown in FIG. 7. After (47) determining the duplicated primary source address (e.g. a MAC address), and extracting an encapsulated secondary source address (e.g. an IP address), a name query is performed (51) to one or more name servers (52), such as a domain name server. This may obtain a more user-friendly reference to the unit which has the duplicated address, such as a URL or server name.

Other types of name servers, such as the Internet's "Who Is" server (found at www.whois.net), or Yahoo's! PeopleSearch can also return administrative contact names, addresses, email addresses, and phone numbers, or server owner information such as company name, telephone number, and address. These types of servers may also be queried, as well.

The additional information obtained through these extra steps can then be incorporated into the error report (53) provided to the system administrator, to allow the system administrator to easily and quickly contact the offending device's owner by telephone, email, fax, pager, instant message, etc.

Automatic Corrective Action

Figure 8:
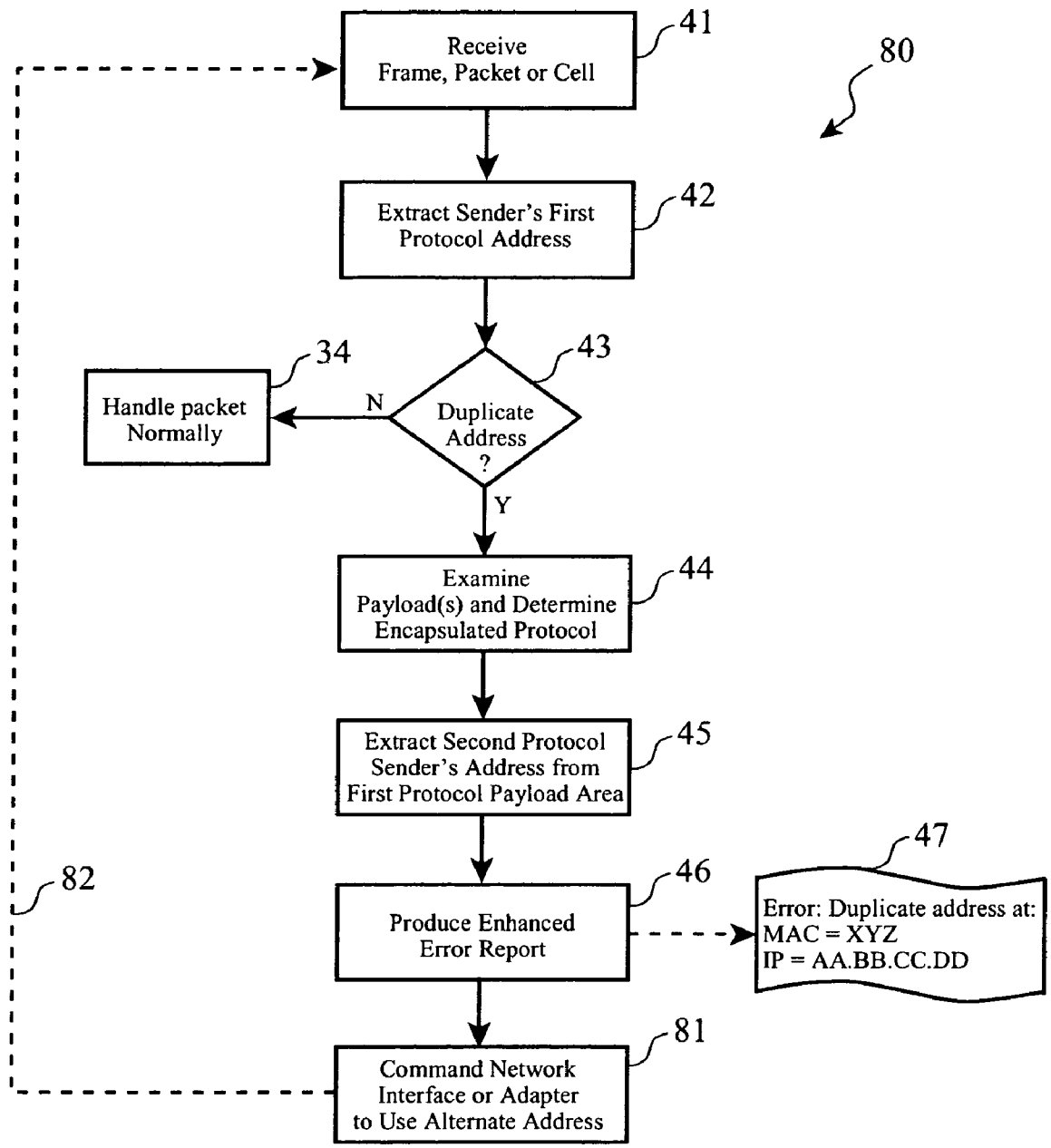
FIG. 8 shows an alternative embodiment of a logical process according to the present invention in which automatic corrective action is taken.

Turning to FIG. 8, the logical process as shown in FIG. 6 can be further enhanced to take automatic corrective action for one or more of the networked devices which improperly share an address. Network adapters such as wireless LAN cards and wired Ethernet interface cards are typically controllable through a device driver software module. In other system configurations, an application programming interface ("API") command is often provided to the system software to allow the system software to command the device to use or assume an alternate network address.

So, according to this enhanced embodiment, the logical process is modified to include commanding (81) the network interface or adapter via a device driver function or API call to use an alternate address such as an alternate MAC address in the case of an Ethernet network. As this alternate address may also already be assigned, the rest of the logical process (41–47) may be repeated (82) until an available address is assumed without any detected conflicts.

SUMMARY

Certain details of the present invention have been provided with respect to one or more embodiments, and specific examples have been disclosed in order to illustrate the invention. It will be recognized by those skilled in the art that the present invention is not limited to these embodiment details or examples, and that alternate protocols, networks, topologies, computing platforms, and programming methodologies may be employed to realize alternate embodiments of the present invention. Therefor, the scope of the present invention should be determined by the following claims.

What is claimed is:

1. A method for providing enhanced error information for duplicated addresses in a computer network, comprising the steps of:

receiving a plurality of packets encoded according to a first protocol, said packets encapsulating data encoded according to a second protocol;

extracting a first source address from said packets according to said first protocol;

determining that said first source address is a substantial duplicate of a known assigned address;

responsive to determination of said first source address being a duplicate address, extracting a second source address from said encapsulated data according to said second protocol; and providing said first source address and said second source address to an error log which is reviewable by a system administrator in order to facilitate correction of said duplicate assigned address.

2. The method as set forth in claim 1 wherein said first protocol is selected from the group of Ethernet, Bluetooth, Universal Serial Bus, Internet Protocol, Wireless local area network, Point-to-Point Protocol, Fiber Distributed Data Interface, Asynchronous Transfer Mode, and Fiber channel.

3. The method as set forth in claim 1 wherein said second protocol is selected from the group of Ethernet, Bluetooth, Universal Serial Bus, Internet Protocol, Wireless local area network, Point-to-Point Protocol, Fiber Distributed Data Interface, Asynchronous Transfer Mode, and Fiber channel.

4. The method as set forth in claim 1 further comprising the steps of:

extracting one or more subsequent source addresses from data further encapsulated by said second protocol according to one or more subsequent protocols; and providing said subsequent source addresses in an error log.

5. The method as set forth in claim 1 wherein said step of extracting a second source address from said encapsulated data according to said second protocol comprises automatically determining the format of said second protocol based upon an analysis of data encapsulated in said packets, and by comparison to data patterns for known protocols.

6. The method as set forth in claim 1 further comprising the steps of:

using said extracted second source address in a name server query;

receiving a name associated with said first source address in response to said name server query; and providing said received name in said error log.

7. The method as set forth in claim 6 wherein said step of using said extracted second source address in a name server query comprises using said second source address in an Internet Domain Name Service Query.

8. The method as set forth in claim 1 further comprising the step of commanding one or more devices sharing said duplicate address to assume an alternate network address.

9. A computer readable medium encoded with software for providing enhanced error information for duplicated addresses in a computer network, said software performing the steps of:

receiving a plurality of packets encoded according to a first protocol, said packets encapsulating data encoded according to a second protocol;

extracting a first source address from said packets according to said first protocol;

determining that said first source address is a substantial duplicate of a known assigned address;

responsive to determination of said first source address being a duplicate address, extracting a second source address from said encapsulated data according to said second protocol; and providing said first source address and said second source address to an error log which is reviewable by a system administrator in order to facilitate correction of said duplicate assigned address.

10. The computer readable medium as set forth in claim 8 wherein said software is configured to extract said first source address according to a first protocol selected from the group of Ethernet, Bluetooth, Universal Serial Bus, Internet Protocol, Wireless local area network, Point-to-Point Protocol, Fiber Distributed Data Interface, Asynchronous Transfer Mode, and Fiber channel.

11. The computer readable medium as set forth in claim 8 wherein said software is configured to extract said second source address according to a second protocol is selected from the group of Ethernet, Bluetooth, Universal Serial Bus, Internet Protocol, Wireless local area network, Point-to-Point Protocol, Fiber Distributed Data Interface, Asynchronous Transfer Mode, and Fiber channel.

12. The computer readable medium as set forth in claim 8 further comprising software for performing the steps of:
   extracting one or more subsequent source addresses from data further encapsulated by said second protocol according to one or more subsequent protocols; and
   providing said subsequent source addresses in an error log.

13. The computer readable medium as set forth in claim 8 wherein said software for extracting a second source address from said encapsulated data according to said second protocol comprises software for automatically determining the format of said second protocol based upon an analysis of data encapsulated in said packets, and by comparison to data patterns for known protocols.

14. The computer readable medium as set forth in claim 8 further comprising software for performing the steps of:
   using said extracted second source address in a name server query;
   receiving a name associated with said first source address in response to said name server query; and
   providing said received name in said error log.

15. The computer readable medium as set forth in claim 14 wherein said software for using said extracted second source address in a name server query comprises software for using said second source address in an Internet Domain Name Service Query.

16. The computer readable medium as set forth in claim 9 further comprising software for commanding one or more devices sharing said duplicate address to assume an alternate network address.

17. A system for providing enhanced error information for duplicated addresses in a computer network, said system comprising:
   a packet receiver configured to receive a plurality of packets encoded according to a first protocol, said packets encapsulating data encoded according to a second protocol;
   a first protocol analyzer configured to extract a first source address from said packets according to said first protocol;
   a duplicate address detector for determining that said first source address is a substantial duplicate of a known assigned address;
   a second protocol analyzer for extracting a second source address from said encapsulated data according to said second protocol responsive to determination of said first source address being a duplicate address; and
   a data logger configured to provide said first source address and said second source address to an error log which is reviewable by a system administrator in order to facilitate correction of said duplicate assigned address.

18. The system as set forth in claim 17 wherein said first protocol analyzer is configured to analyze data encoded according to a protocol selected from the group of Ethernet, Bluetooth, Universal Serial Bus, Internet Protocol, Wireless local area network, Point-to-Point Protocol, Fiber Distributed Data Interface, Asynchronous Transfer Mode, and Fiber channel.

19. The system as set forth in claim 17 wherein said second protocol analyzer is configured to analyze data encoded according to a protocol selected from the group of Ethernet, Bluetooth, Universal Serial Bus, Internet Protocol, Wireless Local Area Network, Point-to-Point Protocol, Fiber Distributed Data Interface, Asynchronous Transfer Mode, and Fiber channel.

20. The system as set forth in claim 17 further comprising one or more subsequent protocol analyzers configured to extract one or more subsequent source addresses from data further encapsulated by said second protocol according to one or more subsequent protocols such that said subsequent source addresses are provided in an error log.

21. The system as set forth in claim 17 wherein said second protocol analyzer is configured to automatically determine the format of said second protocol based upon an analysis of data encapsulated in said packets, and by comparison to data patterns for known protocols.

22. The system as set forth in claim 17 further comprising:
   a name retriever adapted to use said extracted second source address in a name server query; and
   a name query response receiver for receiving a name associated with said first source address in response to said name server query such that said received name is provided in said error log.

23. The system as set forth in claim 22 wherein said name retriever is configures to use said second source address in an Internet Domain Name Service Query.

24. The system as set forth in claim 17 further comprising a networked device commander configured to command one or more networked devices sharing said detected duplicate address to assume an alternate address.

* * * * *